United States Patent
Horie et al.

(10) Patent No.: US 7,386,534 B2
(45) Date of Patent: Jun. 10, 2008

(54) ANSWER SYSTEM FOR TECHNICAL SUPPORT, AND TECHNICAL SUPPORT METHOD

(75) Inventors: Tooru Horie, Hitachiota (JP); Hiraku Ikeda, Hitachinaka (JP); Akira Okabe, Hitachi (JP); Kinichi Suzuki, Tokai-mura (JP)

(73) Assignee: Hitachi, Ltd., Tokyo (JP)

( * ) Notice: Subject to any disclaimer, the term of this patent is extended or adjusted under 35 U.S.C. 154(b) by 1164 days.

(21) Appl. No.: 09/775,575

(22) Filed: Feb. 5, 2001

(65) Prior Publication Data

US 2001/0012337 A1   Aug. 9, 2001

(30) Foreign Application Priority Data

Feb. 9, 2000   (JP) .............................. 2000-038031

(51) Int. Cl.
G06F 7/00 (2006.01)
G06F 17/30 (2006.01)
(52) U.S. Cl. .............................................. 707/2; 707/1
(58) Field of Classification Search .......... 707/1–104.1
See application file for complete search history.

(56) References Cited

U.S. PATENT DOCUMENTS

| | | | | |
|---|---|---|---|---|
| 5,793,964 A | * | 8/1998 | Rogers et al. ............... | 709/202 |
| 5,870,562 A | * | 2/1999 | Butman et al. .............. | 709/238 |
| 6,014,658 A | * | 1/2000 | Pretz ............................. | 707/2 |
| 6,070,142 A | * | 5/2000 | McDonough et al. .......... | 705/7 |
| 6,134,530 A | * | 10/2000 | Bunting et al. ................ | 705/7 |
| 6,147,975 A | * | 11/2000 | Bowman-Amuah ......... | 370/252 |
| 6,177,932 B1 | * | 1/2001 | Galdes et al. ................ | 715/733 |
| 6,205,413 B1 | * | 3/2001 | Bisdikian et al. ............. | 703/24 |
| 6,212,192 B1 | * | 4/2001 | Mirashrafi et al. .......... | 370/401 |
| 6,230,287 B1 | * | 5/2001 | Pinard et al. ................. | 714/31 |
| 6,236,989 B1 | * | 5/2001 | Mandyam et al. ............. | 707/4 |
| 6,260,048 B1 | * | 7/2001 | Carpenter et al. ....... | 707/104.1 |
| 6,542,898 B1 | * | 4/2003 | Sullivan et al. ............. | 707/102 |
| 6,671,818 B1 | * | 12/2003 | Mikurak ........................ | 714/4 |
| 6,721,713 B1 | * | 4/2004 | Guheen et al. ................ | 705/1 |
| 6,957,186 B1 | * | 10/2005 | Guheen et al. ................ | 705/1 |
| 6,961,712 B1 | * | 11/2005 | Perkowski .................... | 705/27 |

FOREIGN PATENT DOCUMENTS

JP      6-117885      4/1994

(Continued)

*Primary Examiner*—Alford Kindred
*Assistant Examiner*—Linh Black
(74) *Attorney, Agent, or Firm*—Mattingly, Stanger, Malur & Brundidge, P.C.

(57) ABSTRACT

An answer system for technical support comprises an web server for receiving information of an inquiry sent from a user via an internet; an inquiry-information data base for storing the inquiry information which has been received by the web server; a fire wall for preventing the information of the inquiry, which is stored in the inquiry-information data base, from being accessed by outsiders via the telecommunication network; an intranet for communicating the information of the inquiry, which is stored by the web server, to an information service furnisher; an input unit for inputting an answer to the information of the inquiry, which has been communicated via the intranet; and a mail server for sending the answer to the information of the inquiry, which has been input by the input unit.

10 Claims, 16 Drawing Sheets

FOREIGN PATENT DOCUMENTS

| | | |
|---|---|---|
| JP | 6-274402 | 9/1994 |
| JP | 9-62740 | 3/1997 |
| JP | 10-154118 | 6/1998 |
| JP | 10-207902 | 8/1998 |
| JP | 10-269293 | 10/1998 |
| JP | 10-301621 | 11/1998 |
| JP | 11-39023 | 2/1999 |
| JP | 11-66003 | 3/1999 |
| JP | 11-161321 | 6/1999 |
| JP | 11-250130 | 9/1999 |
| JP | 2000-20541 | 1/2000 |
| WO | 98/33130 | 7/1998 |

\* cited by examiner

FIG. 4

| 質問内容詳細 | | | |
|---|---|---|---|
| 質問番号 | HCL-0012 | 受付日 | 2000/02/03 |
| 回答要求日 | 明日中 | 状況 | 顧客回答済 |
| 機器名 | Steam Turbines | 関連質問番号 | |
| 件名 | SCV Sticking Problem | 電子会議室 | |
| 関連質問資料 | | | |
| 質問(英文) | EPC has asked if HTC recommends installing grease fittings for application of high temperature grease to SCV camshaft bushings (oiless bushings). XED4 will have brief maintenance outage this coming weekend and if we make such recommendation then EPC would like some details so that they can perform such work on this weekend. I have given a preliminary verbal reply that we will likely advise against using grease in the oiless bushings but that we will consult with T-Pukei. Please send your comments to me through TSA Answer Center and also by fax or e-mail          If possible please send reply this evening as I will business trip to Edmonton tomorrow.<br><br>Best regards, JJActon | | |
| 質問(和文) | EPCから、高温用grease をSCVカムシャフト・ブッシング(オイルレス・ブッシング)に注入するための取り付け口をHTCが推奨するかとの問い合わせを受けました。この週末にXED4は点検補修のために短期停止をします。もしHTCが推奨するというなら、今週末に取り付けを行なえるように、その要領を要求しています。<br>私は以前、グリースをオイルレス・ブッシングに使うことにはあまり賛成できないが、T-Pukeiに相談してみますと口頭で返答しました。TSAアンサーセンターからそちらのコメントを送ってください。ファックス      または電子メール          へも同様に返答ください。明日エドモントンに出張に行くため、できましたら今晩にも返事ください。<br>JJActon | | |
| 回答(英文) | We would like to reply as below.<br>1)The camshaft bushing is oil-less bushing No.500.Basically grease is not used for this bushing type.<br>HTC does not have such an experience as what EPC intends to do<br>2)Our recommendation is that to conduct hot check immediately after stopping the turbine.<br>The hot check means to conducted to confirm that SCV and servo-motor can move smoothly to both open and close directions.<br>Please pay a special attention when the servo-motor stroke is around 120mm.<br><br>Best Regards,<br>TGS/ Hotta | | |
| 備考 | | | |

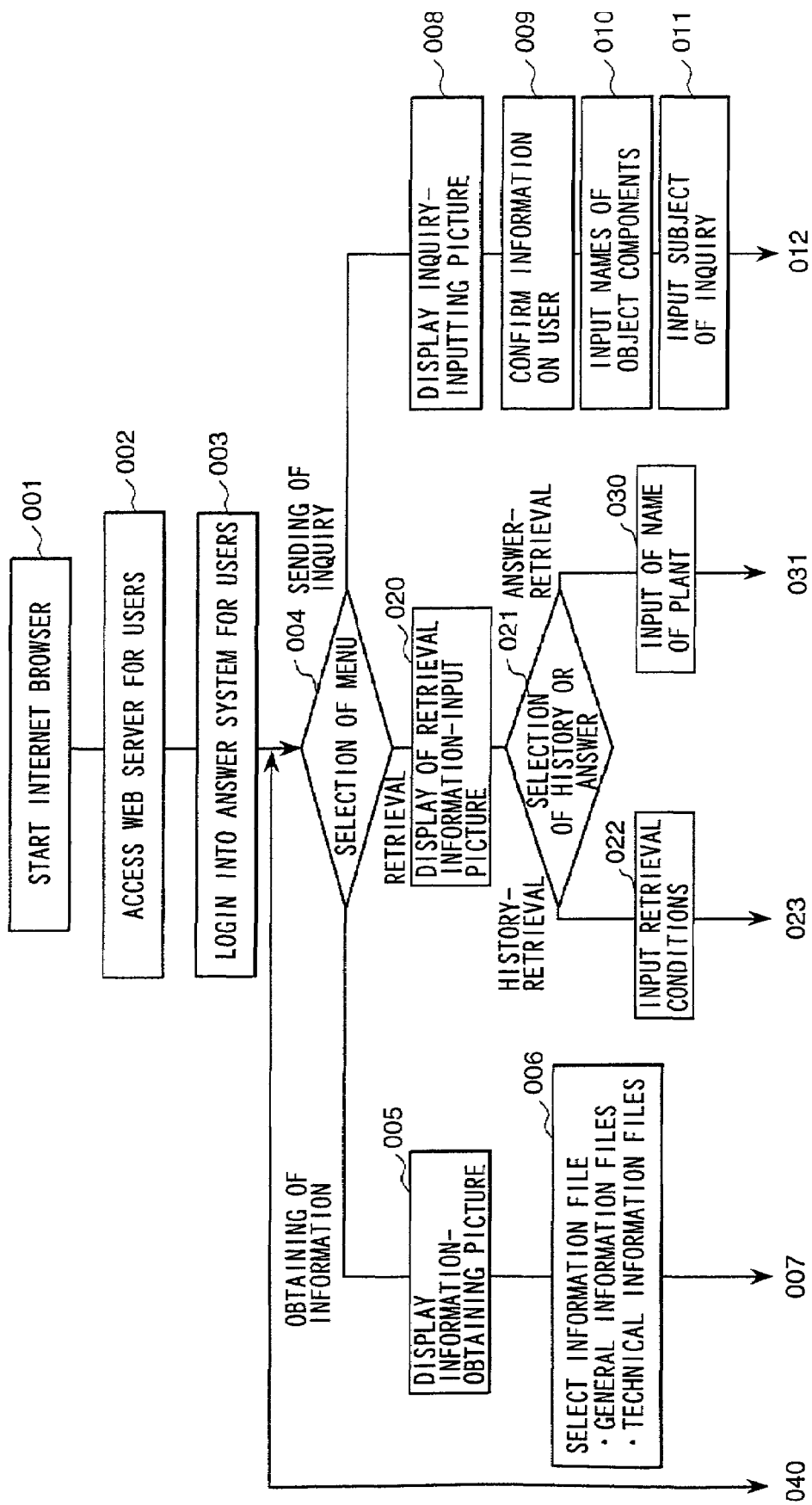

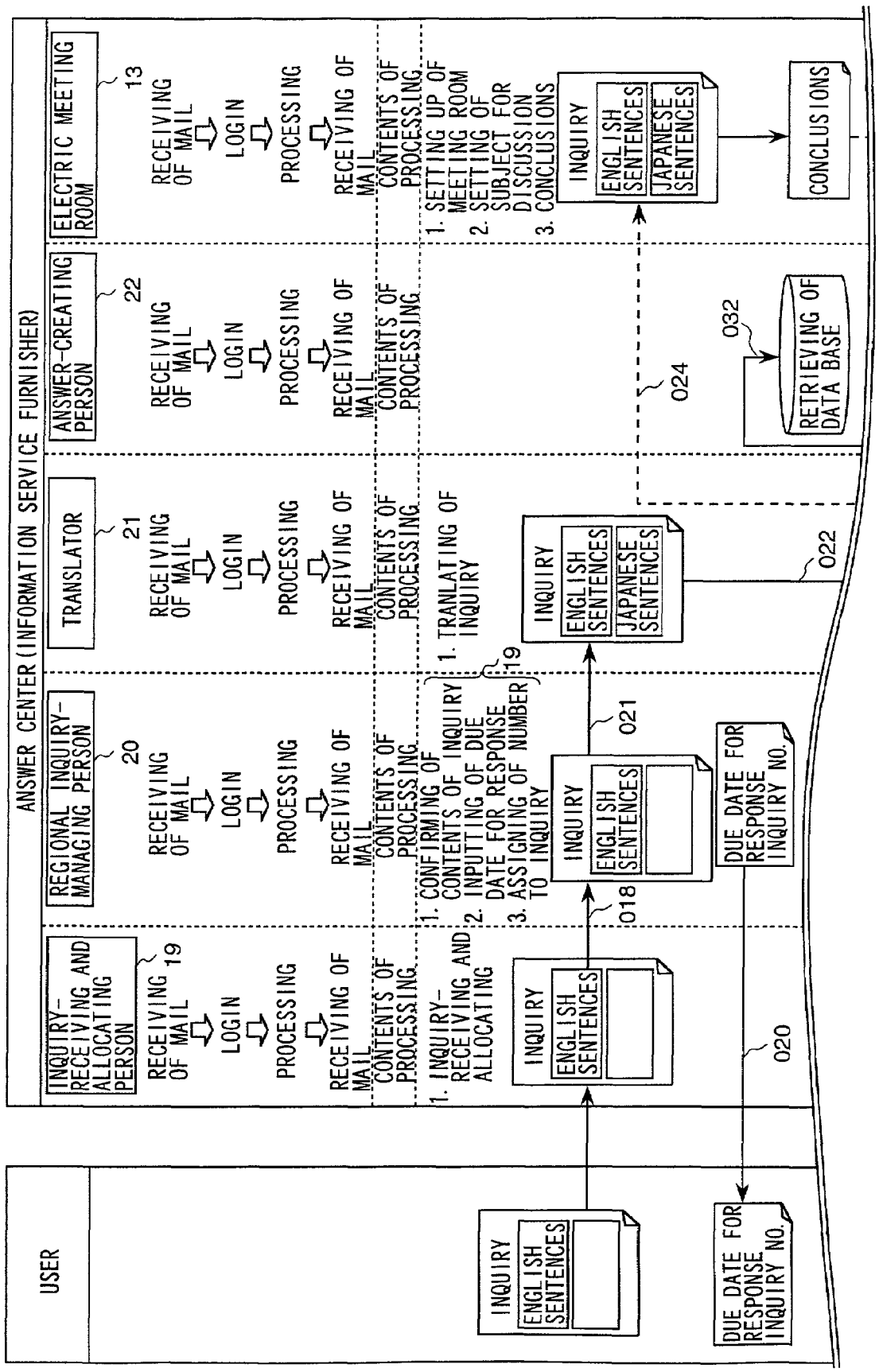

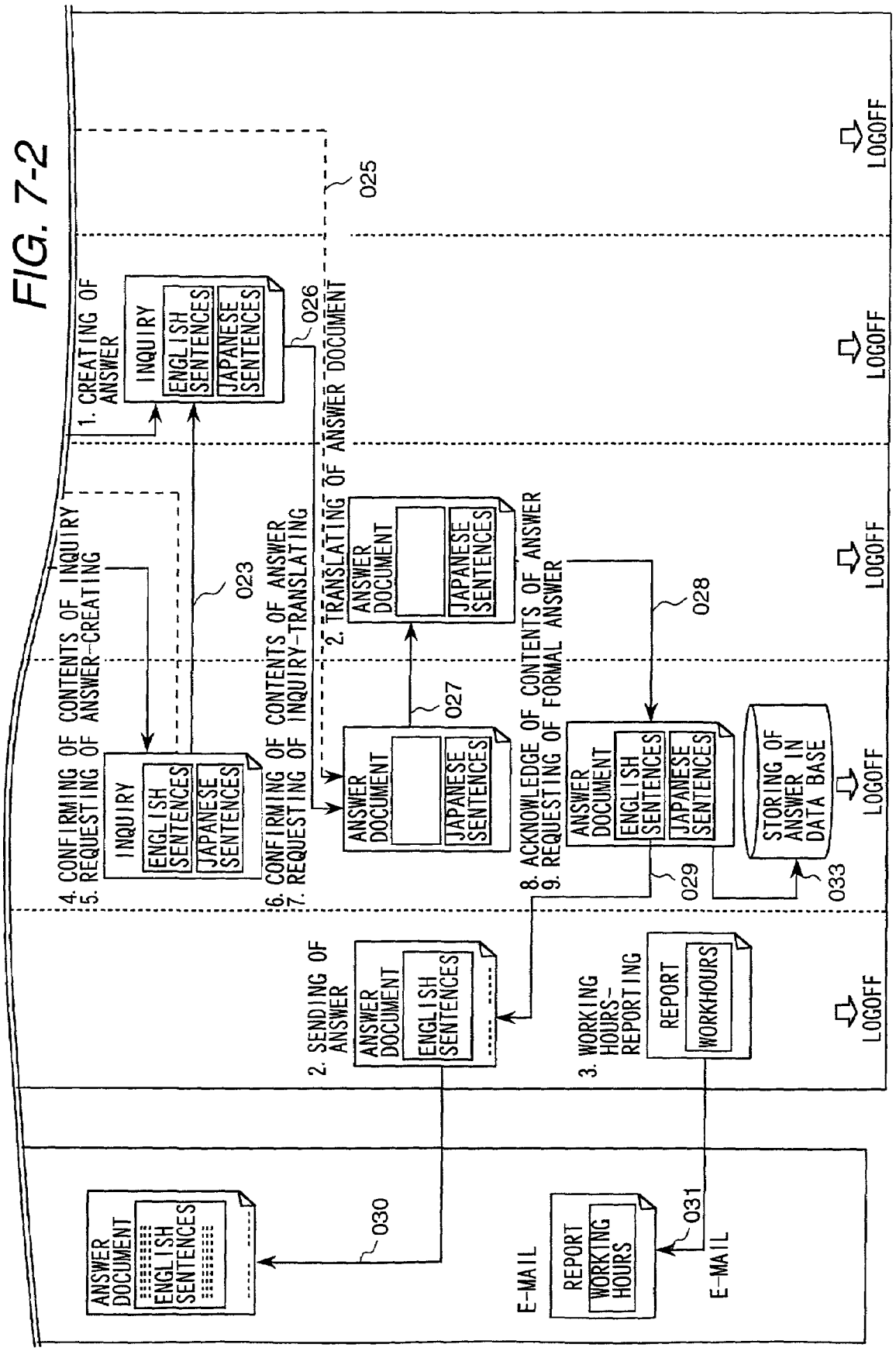

FIG. 11
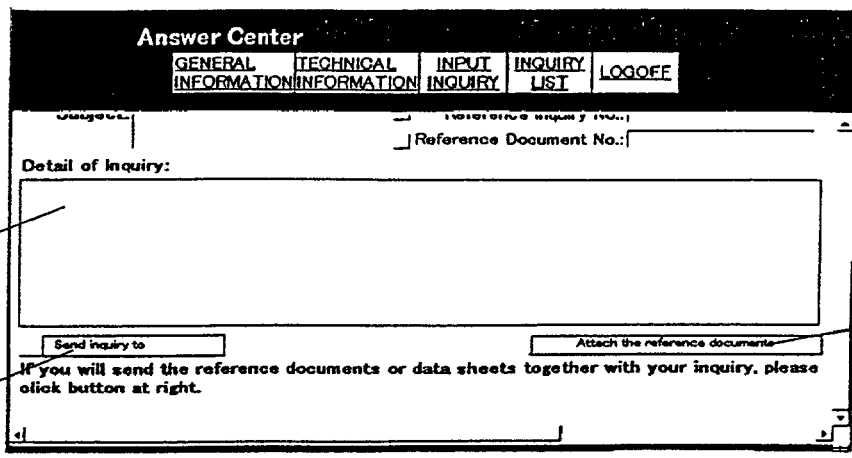
FIG. 12
FIG. 13
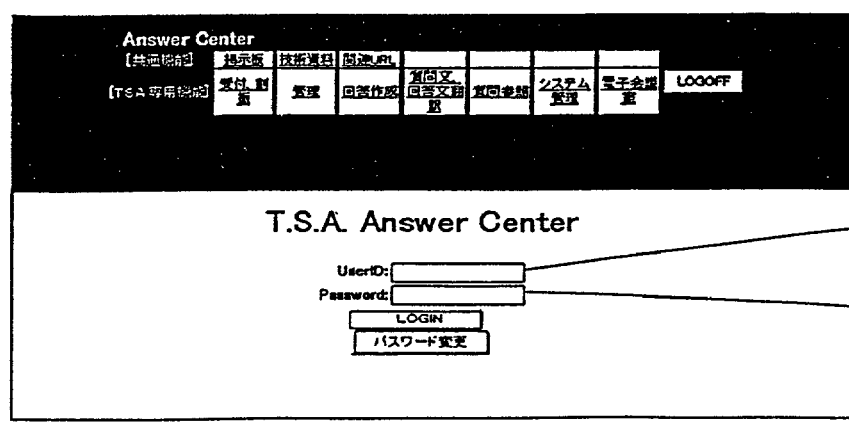

| NAME OF COMPONENT | RETRIEVAL CONDITIONS | | | RESULT OF RETRIEVAL (EXAMPLE OF ANSWER) | |
|---|---|---|---|---|---|
| | PORTION OF COMPONENT | PHENOMENON | CAUSE | COUNTERMEASURE | |
| GAS TURBINE | COMBUSTOR | CRACKING AT MAIN COMBUSTION CHAMBER | LARGE THERMAL STRESS | ADHIBIT REPAIR BY WELDING | |
| GAS TURBINE | BEARING | LARGE VIBRATION | UNBALANCE | ATTACH A BALANCE WEIGHT | |
| GAS TURBINE | BEARING | LARGE VIBRATION | DEVIATION IN ALIGNMENT | ADJUST ALIGNMENT | |
| STEAM TURBINE | MOVING BLADE | INCREASE OF VIBRATION AMPLITUDE | DEPOSIT OF SCALE | PERFORM HONING PROCESS IN PERIODIC INSPECTION | |
| · | · | · | · | · | |
| · | · | · | · | · | |
| · | · | · | · | · | |

ANSWER SYSTEM FOR TECHNICAL SUPPORT, AND TECHNICAL SUPPORT METHOD

BACKGROUND OF THE INVENTION

The present invention relates to an answer system for technical support and a technical support method to furnish technical services to a user via a telecommunication network.

Conventionally, as technical support for a user, direct support performed by engineers who are sent to the field, or indirect support which is performed by furnishing of technical documents or answer papers to inquiry form the user, has been carried out. As an example of the indirect support for a user, the furnishing of technical documents to an operator or a maintenance engineer, or the answering to an inquiry from the operator or the maintenance engineer, is generally performed in the following procedures.

(1) A person in a charge in a business department of a power-generating facility maker receives a request for technical documents, or a technical inquiry, from a user of a power plant by means of visiting, telephoning, facsimile, or mailing.

(2) The person in a charge in the business department communicates the contents of the request or the technical inquiry to a person in a charge in a technical department of the central office by the above-mentioned means.

(3) The person in a charge in the technical department confirms contents of the request or the technical inquiry, and sends them to a design, inspection, or fabrication department in charge in a factory directly responsible for these contents.

(4) A person in charge in the factory confirms the contents of the request or the technical inquiry, and prepares the requested technical documents or an answer to the technical inquiry.

(5) The prepared technical documents or the answer to the technical inquiry is sent to the person in a charge in the technical department of the central office.

(6) Lastly, the technical documents or answer is sent to the user of the power plant via the person in a charge in the business department.

Thus, in the above-described conventional procedures, the request for the technical documents concerning the operation or the maintenance, or the inquiry concerning the technical items, are first sent to the business department. Further, the person in charge in each department selects the next person in charge, and sends the necessary information to the selected person in turn by means of visiting, telephoning, facsimile, or mailing.

As described above, to implement technical support for a user, technical information has been conventionally communicated in the form of documents such as technical documents, an inquiry paper, etc. Such as a communication means cannot quickly correspond with a request for technical support from a user. Therefore, quick and accurate technical support has been strongly desired.

SUMMARY OF THE INVENTION

The present invention has been achieved in consideration of the above-described problems, and is aimed at providing an answer system for technical support and a technical support method, which are capable of quickly and accurately performing technical support to a request or an inquiry from a user.

To achieve the above objective, the present invention provides an answer system for technical support for furnishing technical information services via a telecommunication network, the answer system for technical support comprising: an web server for receiving information of an inquiry sent from a user via an internet; an inquiry-information data base for storing the inquiry information which has been received by the web server; a fire wall for preventing the information of the inquiry, which is stored in the inquiry-information data base, from being accessed by outsiders via the telecommunication network; an intranet for communicating the information of the inquiry, which is stored by the web server, to an information service furnisher; an input unit for inputting an answer which responds to the information of the inquiry, which has been communicated via the intranet; and a mail server for sending the answer to the information of the inquiry, which has been input by the input unit.

Further, to achieve the above objective, the present invention provides a technical support method of furnishing technical information services via a telecommunication network, the technical support method comprising the steps of: receiving information of an inquiry sent from a user via an internet by using a web server, via a fire wall for preventing the information of the inquiry from being accessed by other users via the telecommunication network; storing the information of the inquiry, which has been taken into an inquiry-information data base by the web server; communicating the information of the inquiry, which has been stored by the web server, to an information-furnishing unit via an intranet; and sending an answer which responds to the information of the inquiry communicated to the information-furnishing unit, to the user via a mail server.

BRIEF DESCRIPTION OF THE DRAWINGS

FIG. 4 is an example of a display showing an inquiry and an answer to the inquiry.

FIG. 7 is a flow chart of processes performed in the answer system for an information service furnisher according to the present invention.

FIG. 11 is an example of a picture displayed on the screen for input operations which are performed by a user.

FIG. 12 is an example of a picture displayed on the screen for input operations which are performed by a user.

FIG. 13 is an example of a picture displayed on the screen for input operations which are performed by an information service furnisher.

FIG. 14 is an example of a picture displayed on the screen for input operations which are performed by an information service furnisher.

FIG. 15 is an example of a picture displayed on the screen for input operations which are performed by an information service furnisher.

FIG. 16 is an example of a picture displayed on the screen for input operations which are performed by an information service furnisher.

FIG. 20 is an example of a picture displayed on the screen for input operations which are performed by an information service furnisher.

FIG. 21 is an example of a picture displayed on the screen for input operations which are performed by an information service furnisher.

FIG. 22 is an example of a picture displayed on the screen for input operations which are performed by an information service furnisher.

FIG. 23 is an example of a picture displayed on the screen for input operations which are performed by an information service furnisher.

FIG. 24 is an example of a picture displayed on the screen for input operations which are performed by an information service furnisher.

FIG. 25 is an example of a picture displayed on the screen for input operations which are performed by an information service furnisher.

FIG. 26 is a picture showing examples of input of the retrieval conditions and results of the retrieval.

DETAILED DESCRIPTION OF THE EMBODIMENTS

In accordance with the above system or method provided by the present invention, a user can access a web server which is provided by a information service furnisher, via an internet, and acquire (download) a set of disclosed information. Further, if the user input his inquiry to the web server, the inquiry is automatically stored in the web server. This inquiry is periodically and automatically taken into a second web server, and an answer to the inquiry is created in an answer center. Lastly, the created answer is sent to the user by e-mail. That is, the user can easily and timely acquire the information which he needs. By the answer system of the present invention, since the information service furnisher can instantly recognize what kind of information the user needs, or what kind of inquiry he has, the furnisher can optimally conduct business activities. Thus, business advantages are brought about by the information-exchange between the user and the furnisher, and a commercial value of the information-exchange, this commercial value being changed depending on the quality (contents), the quantity, and the timing of the supplied information service, is determined. This can bring a information service-furnishing business into existence.

Moreover, in accordance with the above system or method provided by the present invention, a series of inquiry numbers are given to inquiries sent from each user, and the inquiries are consistently managed until answers to all the inquiries are completed. Therefore, it is easy to manage the prevention of any omission or delay in answering to the inquiries, and since the inquiries are stored in a data base, the time-series control or the reuse of the answers to the respective inquiries, has become possible.

Hereafter, details of the embodiments will be explained with reference to the drawings.

Figure 1:
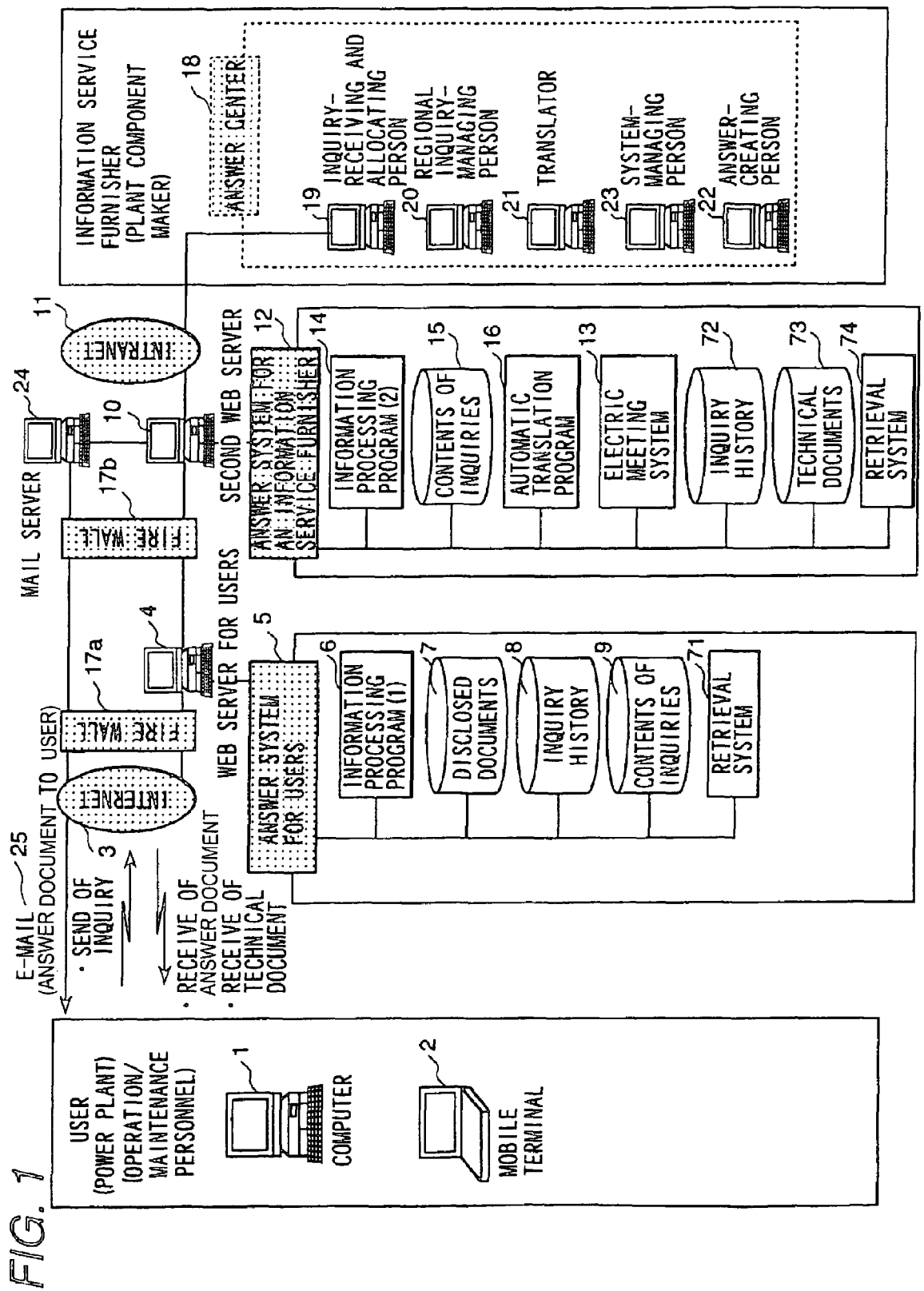
FIG. 1 is a schematic diagram showing the composition of an answer system for technical support of an embodiment according to the present invention.

FIG. 1 schematically shows the composition of an answer system for technical support of an embodiment according to the present invention. Meanwhile, although an answer system for technical support, which is used by a user in a power plant, will be explained in the following as an example of an object facility to which the present invention is applied, an object facility to which the present invention is applied is not restricted to an answer system for a power plant.

In each power plant to which an answer system of this embodiment is applied, computers 1 or mobile terminals 2 which are used by operators or maintenance engineers (hereafter referred to as users), are provided. Each user can use an internet via the computers 1 and the mobile terminals 2. Also, the user can access an answer system 5 for the users, which is incorporated in a web server 4 for users, set p by a power plant maker (hereinafter referred to as an information service furnisher) via the internet. A fire wall 17a is provided to prevent an unauthorized access performed by an outside person (outsider), and it permits an access to the answer system 5 for the users, which is conducted by a registered user.

The answer system 5 for the users includes an information processing program (1) 6 for displaying a login picture, a menu picture, an inquiry format picture, and taking in data input from these pictures; and a plurality of data bases such as a document data base 7 in which documents disclosed to the users are stored, an inquiry history data base 8 in which a history of all inquiries sent from the users is stored, an inquiry content data base 9 in which information on inquiries input to the web server 4 for the users (to the information service furnisher), etc. Further, a retrieval system 71 for retrieving information stored in the above data bases 7, 8, 9 is situated in the answer system 5 for the users. Also, a fire wall 17b is provided to prevent outsiders from encroaching on the second web server 10 or an intranet 11 which is provided at the side of the information service furnisher. In the answer system 5 for the users which is composed as described above, information of the inquiry which the user has registered in the answer system 5 for the users, passes through a fire wall 17b, and is automatically taken into the second web-server 10. Further, the retrieval system 71 retrieves information in the above document data base 7, the inquiry history data base 8, and the inquiry content data base 9, in accordance to the request input by the user.

An answer system 12 for the information service furnisher, which is operated in the intranet 11, is situated in the second web server 10. The answer system 12 for the information service furnisher includes an information processing program 14 for periodically taking in contents of respective inquires sent from the users, which are stored in the inquiry content data base 9, and for creating each answer, which is implemented by a answer center 18; an inquiry content data base 15 in which the contents of respective inquiries sent from the users are stored; an automatic translation program 16 for translating, for example, an inquiry written in a foreign language such as English to a Japanese inquiry; an electronic meeting system 13 by which a meeting about the inquiry sent from the user is held online; an inquiry history data base 72 in which a history of all inquiries sent from the users are stored; a technical document data base 73 I which technical documents such as a design specifications, design drawings, etc; and a retrieval system 74 for retrieving information in the inquiry history data base 72 or the technical document data base 73. The answer center 18 includes at least; one inquiry-managing person 20, one translator 21, one answer-creating person 22, and one system-managing person 23. Further, processes implemented for creating each answer are executed by these persons while using an information processing program (2) 14. Also, the retrieval system 74 retrieves information stored in the inquiry content data base 15 or the inquiry history data base 72 in accordance with the request sent from the answer center 18. The contents of the answer created by the answer center 18 are made up as an answer document 25, and this answer 25 is sent to the user by e-mail via a mail server 24.

The user accesses the web server 4 for the users, in which the answer system 5 for the users is incorporated, via the internet 3, by inputting the mail address of which the user is informed in advance, while using the computer 1 or the mobile terminal 2. Further, the user logs in with his identifier and a password, of which he is informed in advance, on the first picture displayed by the answer system 5 for the users. Also, the user sends his inquiry to the web server 4 for the users, or receives an answer document or a technical document according to guides which are displayed in pictures shown by the information processing program (1) 6. Meanwhile, the contents of the inquiry sent by the user are stored in the inquiry history data base 8 and the inquiry content data base 9. Furthermore, the user acquires information for operations or maintenance of the plant from the disclosed document data base 7.

The information service furnisher situates the answer center 18 composed of the inquiry-receiving and allocating person 19, the regional inquiry-managing person 20, the translator 21, the answer-creating person 22, and the system-managing person 23, in the environment of the intranet 11. By the answer system 12 for the information service furnisher, the contents of the inquiries sent by the users are passed trough the fire wall 17, and are automatically taken into the inquiry content data base 15. Here, automatic retrieval processing is executed in the answer system 12 for the information service furnisher, and if there is a new inquiry, a fixed-form e-mail is automatically sent to the inquiry-receiving and allocating person 19 in the answer center 18.

By receiving the fixed-form e-mail, the inquiry-receiving and allocating person 19 recognizes that a new inquiry has sent from a user. Then, the person 19 accesses the second web server 10 in which the answer system 12 for the information service furnisher is incorporated, via the intranet 11. Further, the person 19 logins into the second web server 10 in which the answer system 12 for the information service furnisher is incorporated, and corresponds with the inquiry sent from the user according to procedures presented by the information processing program (2) 14. Lastly, the person 19 selects the next person in charge in the members of the answer center 18, and sends a request for work corresponding with the inquiry to the selected person by using a fixed-form e-mail function provided in the information processing program (2) 14 in the answer system 12 for the information service furnisher.

The regional inquiry-managing person 20, the translator 21, or the answer-creating person 22, who has received the fixed-form e-mail of the request for work corresponding with the inquiry, logins into the answer system 12 for the information service furnisher, and corresponds with the inquiry, in the same manners as the inquiry-receiving and allocating person 19. Then, they select the next person in charge in the members of the answer center 18, and sends a request for work corresponding with the inquiry to the selected person by a fixed-form e-mail. Lastly, the answer document which has been created in the answer center 18 is sent to the user by the inquiry-receiving and allocating person 19 by means of e-mail via the mail server 24. Meanwhile, in the answer center 18, the answer document is efficiently created by using the automatic translation program 16 and the electronic meeting system 13, which are linked to the answer system 12 for the information service furnisher.

Figure 2:
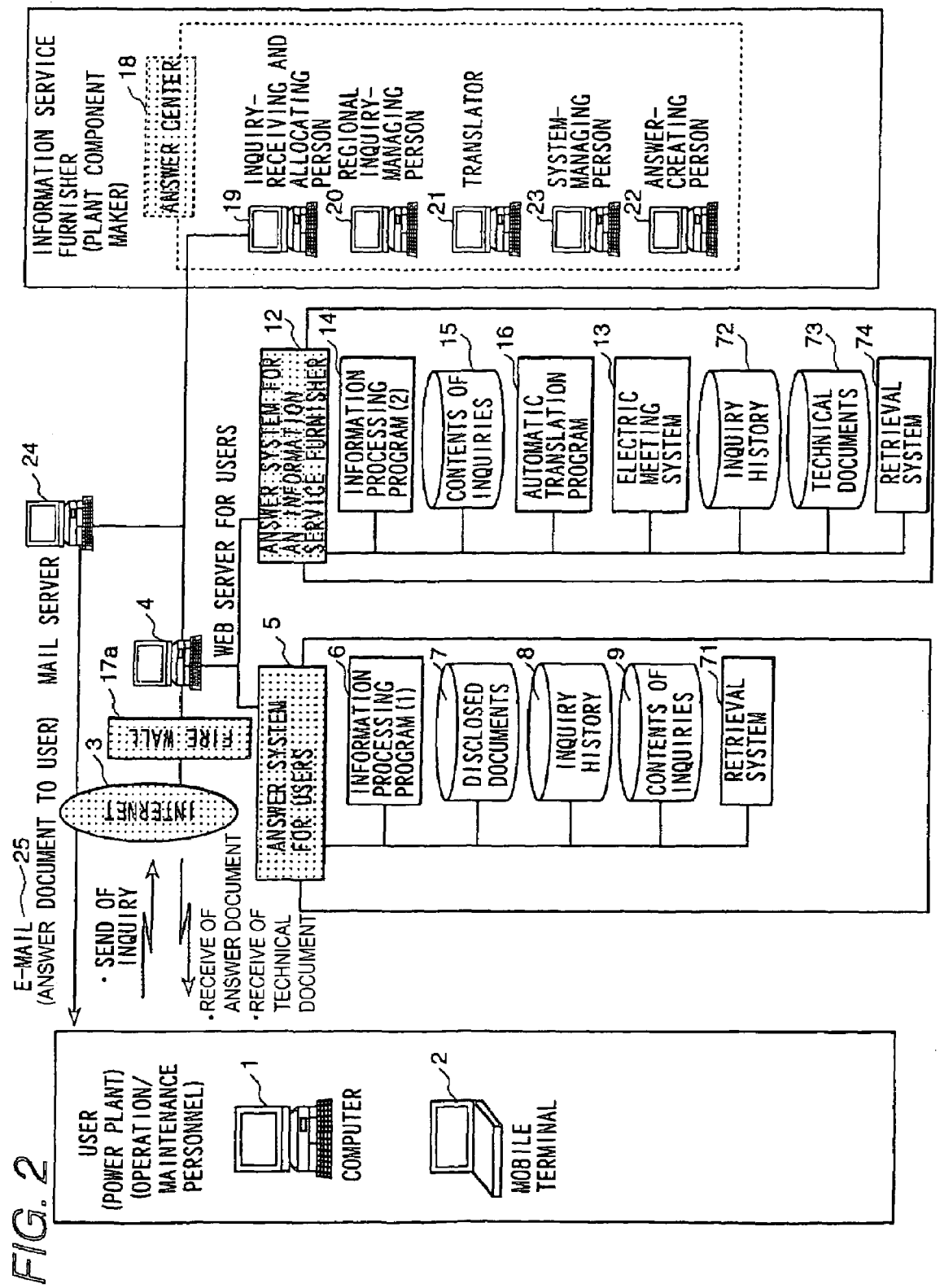
FIG. 2 is a schematic diagram showing the composition of an answer system for technical support of another embodiment according to the present invention.

FIG. 2 schematically shows the composition of an answer system for technical support of another embodiment according to the present invention. Meanwhile, explanations of the same elements as those in FIG. 1 are omitted in the following.

In the embodiment shown in FIG. 2, both the answer systems 5 and 12 for the users and the information service furnisher are situated in the web server 4 for the users. In this embodiment, although the users and the information service furnisher use one web server jointly, the technical support for the users can be performed by the same operations as those in the embodiment shown in FIG. 1.

Figure 3:
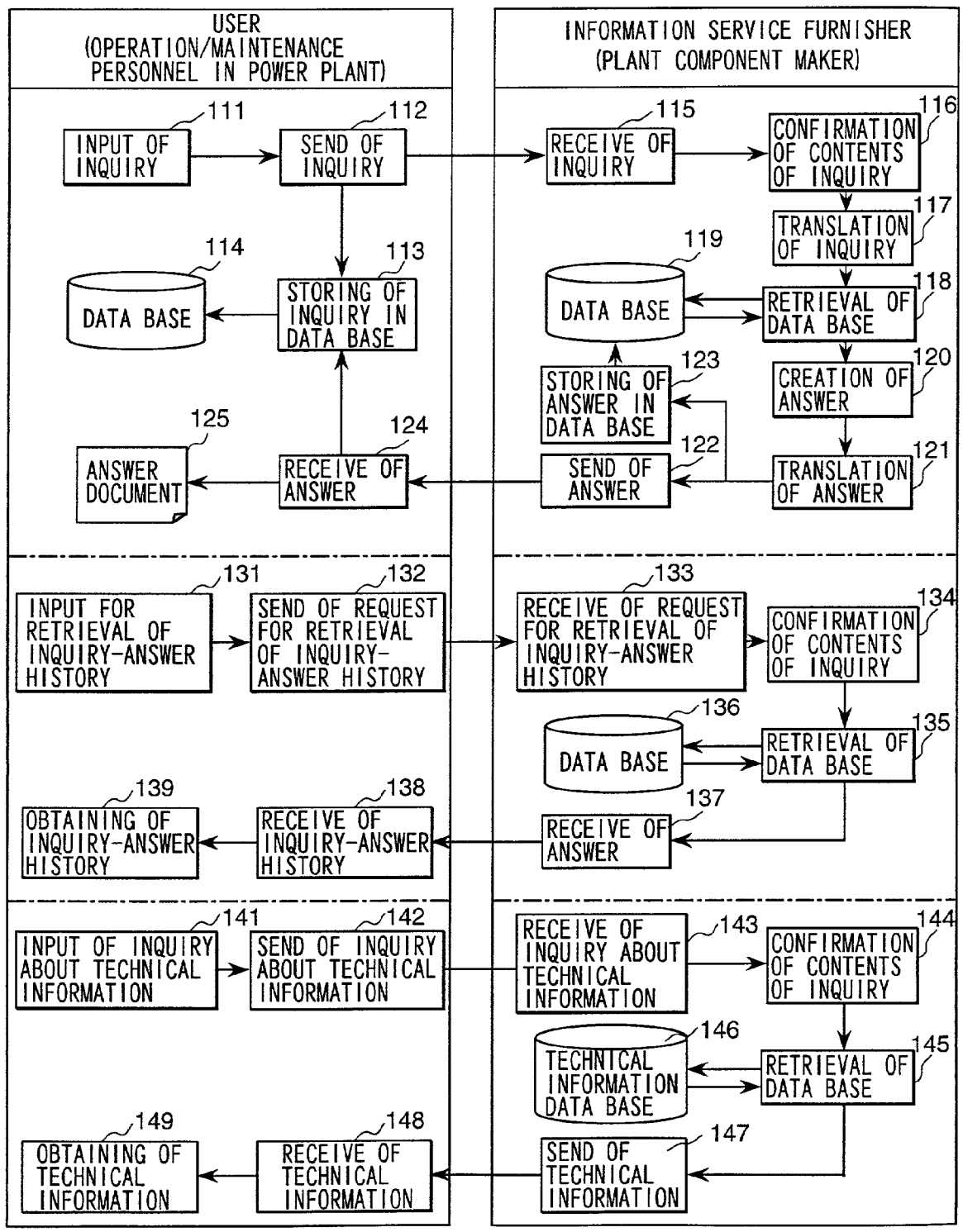
FIG. 3 is a schematic flow of processes performed by the answer system for technical support of the present invention.

In FIG. 3, a schematic flow of processes which are performed by the answer system for technical support according to the present invention, is shown.

In step 111, if the user sends an inquiry concerning the operation or maintenance of a power plant to the information service furnisher, he connects his communication terminal to the system at the side of the information service furnisher, and inputs information of the inquiry. In step 112, the input information of the inquiry is sent from the user to the information service furnisher. Moreover, in step 113, by performing the process to store the information of the inquiry input by the user in the data base at the side of the users, the information of the inquiry can be stored in a data base 114.

In step 115, the information of the inquiry sent from the user is received by the web server set up by the information service furnisher. In step 116, contents of the received information of the inquiry is first confirmed. For example, it is confirmed what group of components the received information of the inquiry concerns from among groups of components, such as turbines, generators, auxiliary machines, components in a feed water system, control devices, etc., which have been classified in advance. Moreover, in step 117, if the inquiry sent from the user is written in a foreign language, the inquiry is translated as the need arises. Meanwhile, the order of the content-conformation process (step 116) can be permutated with that of the translation process (step 117).

In step 118, information stored in a data base 119 is retrieved in order to create an answer to the information of the inquiry whose contents have been confirmed. In the data base-retrieval process (step 118). the retrieving is carried out so that an answer which is most suitable for the contents of the inquiry, is selected from among answers stored in the data base 119 in advance. Next, in step 120, an answer to the inquiry sent from the user is created based the result of the retrieval performed in step 118. Here, in step 121, it is possible to translate the created answer to a foreign language answer as the need demands. In step 122, the answer created in the answer-creation process (step 120) is sent to the user via the telecommunication network Lastly, in step 124, the user receives the answer sent from the information service furnisher. Thus, the user can obtain an answer document 125 to his inquiry.

Meanwhile, the inquiry sent from the user, and the answer created in step 120 are stored as inquiry-answer history information in the data base 119. In this way, by storing the information on the inquiry and the answer to the inquiry in the data base, it becomes possible to manage the information as history information, and this history information can be used in the data base-retrieval process (step 118). Also, by storing the answer received by the user in the data base 114 in the answer-storing process (113), the history information can be managed at the side of the users.

Next, an embodiment of the processing in which the information on a history of all inquiries sent from the users, and answers to the respective inquiries, sent from the information service furnisher, is retrieved, is explained below.

In step 131, if the user retrieves the history information on all inquiries concerning the operation or maintenance management of the power plant, which have been sent to the information service furnisher, he connects his communication terminal to the information service furnisher via the telecommunication network, and inputs retrieval conditions. Meanwhile, not only history information of the whole plant but also that of each component in the plant can be designated as the retrieval conditions. In step 132, The input request for retrieval of the history information is sent to the information service furnisher.

Further, the request for retrieval of the history information, sent from the user, is received by the web server set up by the information service furnisher in step 133, and the contents of retrieval of the history information, requested by the user, is confirmed in step 134. Then, in step 135, the inquiry-answer history information stored in a data base 136 is retrieved. In step 137, the result of the retrieval of the history information, performed in step 135, is sent from the web server at the side of the information service furnisher to the user.

Lastly, in step 138, the user receives the result of the retrieval of the history information from the information service furnisher. Thus, the user can obtain the history of; all inquiries sent by him, and the answers to the respective inquiries.

In the following, an embodiment of the processing in which technical information of the power plant is obtained, will be explained. If the user intends to obtain technical information such as a design specification, a design drawing, etc., by inputting a request for the technical information via the communication terminal in Step 141, the request for technical information is sent to the information service furnisher in step 142. In step 144, the information service furnisher confirms the contents of the technical information request which has been received by the web server in step 143. In step 145, technical information stored in technical information data base 146 is retrieved so that the technical information requested by the user is selected. Further, in step 148, the user receives the technical information sent from the information service furnisher. Thus, the user can obtain the technical information requested by him in step 149.

In FIG. 4, an example of a display picture showing an inquiry and an answer to the inquiry, which is presented by the answer system for technical support according to the present invention, is shown. Here, by storing the pair of the inquiry sent from the user and the answer to the inquiry, such as that shown in FIG. 4, in a data base, it is possible to use the information on the pairs of the respective inquiries and the corresponding answers, which is stored in the data base, as inquiry-answer history information.

Figure 5A:
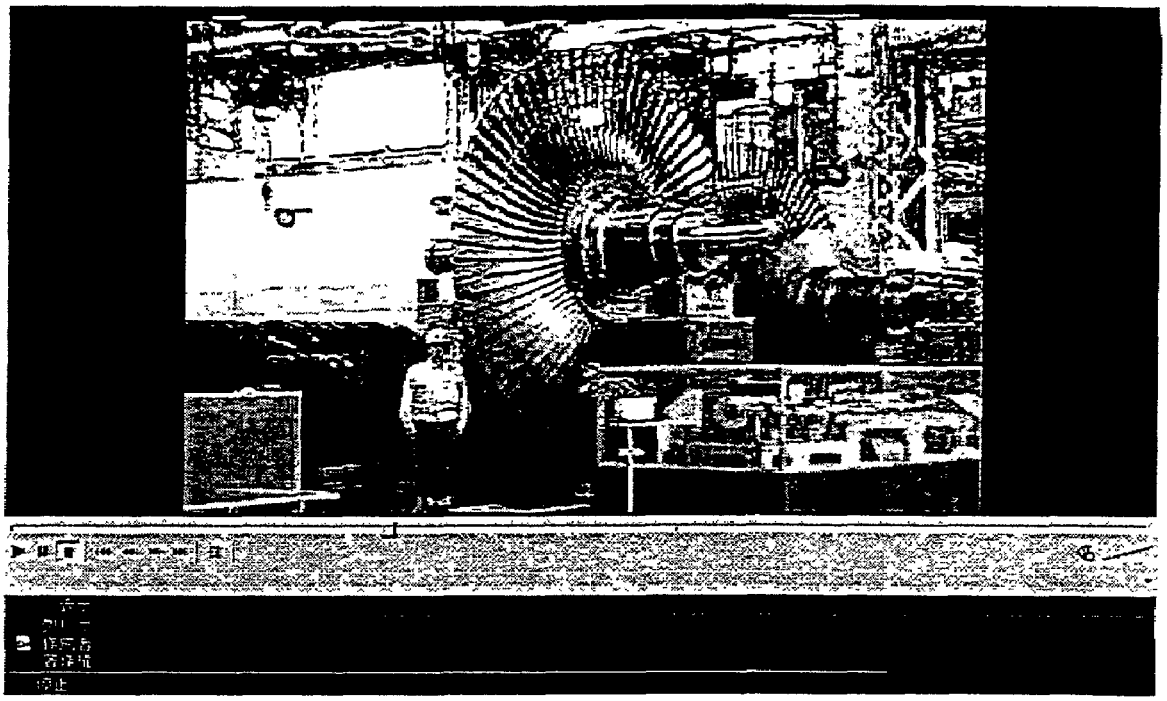
FIGS. 5(a) and 5(b) are examples of displays showing technical information including voice and image data.
Figure 5B:
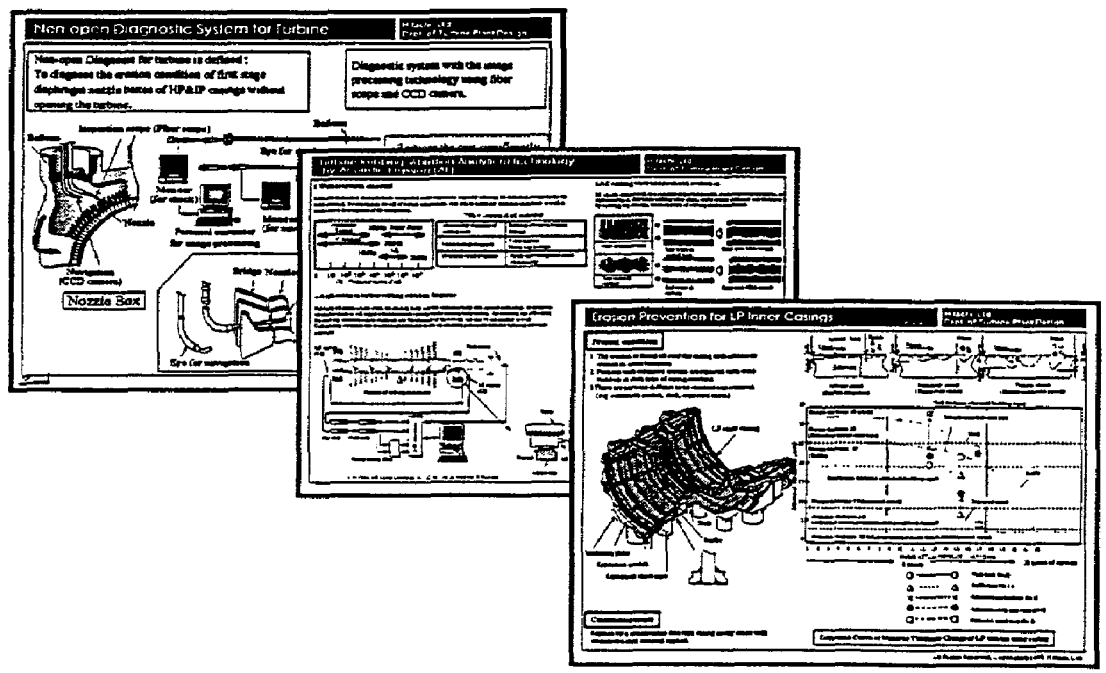

FIGS. 5(*a*) and 5(*b*) show examples of technical information stored as technical document files which include voice and/or image data, which is furnished to the users. These technical document files are attached to an answer document in order to explain the answer document more specifically, or they are disclosed in the web server. Meanwhile, FIG. 5(*a*) shows an example of a picture which displays technical information including image and voice data, and FIG. 5(*b*) shows examples of pictures which display technical information files on the anomaly-diagnosis of the power plant, the analysis of vibration in the power plant, the preventive maintenance for the power plant.

Figures 2, 6:
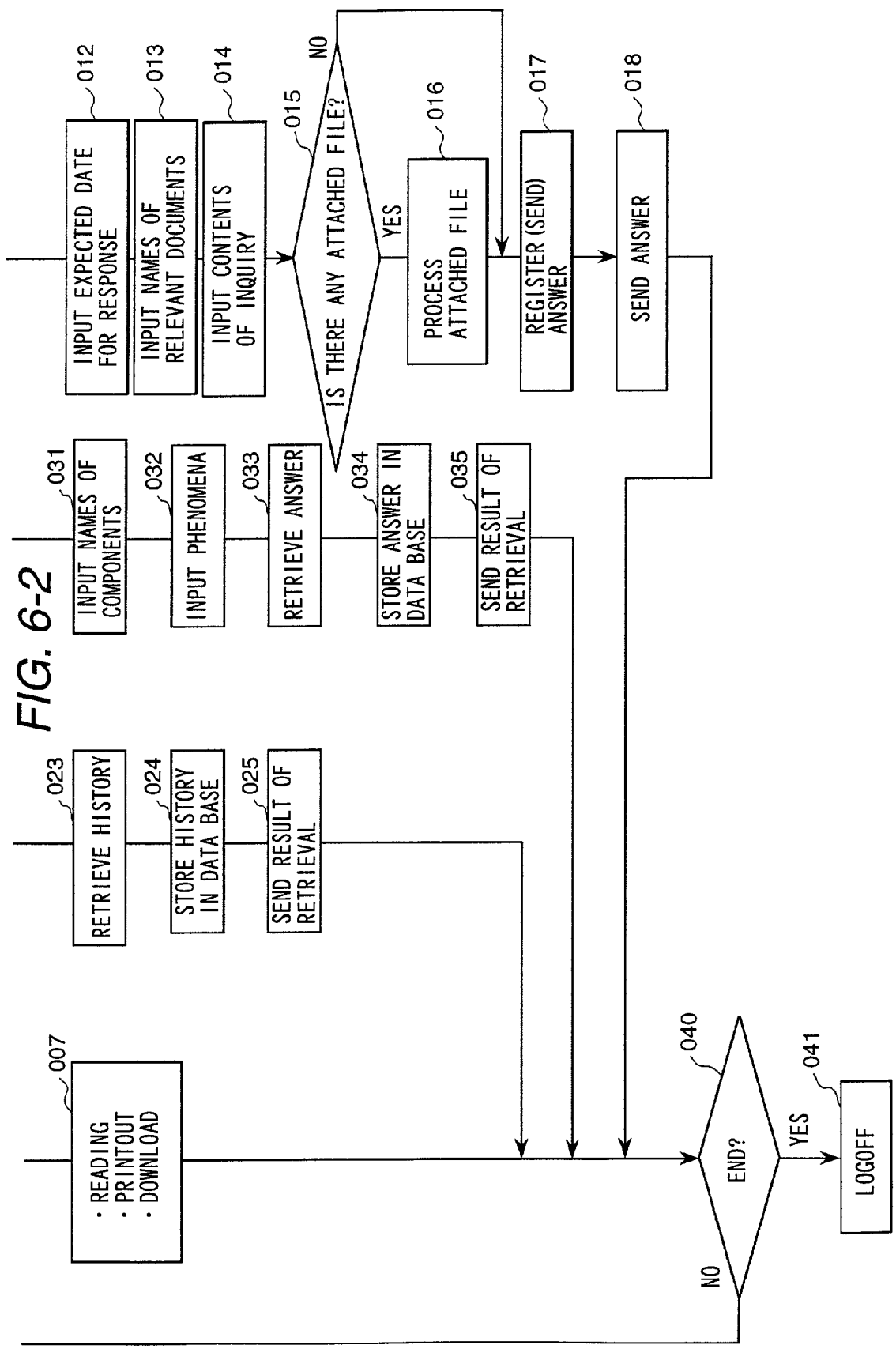
FIG. 6 is a flow chart of processes performed in the answer system for users according to the present invention.

In FIG. 6, a flow chart of input processes performed by a user to acquire technical information or to make an inquiry to the answer system 5 for the users, while using the answer system 5 for the users, is shown. That is, the processes performed by the information processing program (1) 6 shown in FIG. 1, are shown in detail in FIG. 6.

A user starts up an internet browser in step 001, accesses the designated web server for the users in step 002, and logins into the answer system for the users in step 003. Next, in step 004, a menu-selection process is carried out by selecting one of an information-obtaining menu for obtaining technical information such as a design drawing, an inquiry menu for making an inquiry about a countermeasure to a malfunction of a component, etc., and a retrieval menu for retrieving the inquiry history information. If he intends to obtain technical information, he opens an information-obtaining picture in step 005, and selects a general information file, a technical information file, or an inquiry history file in step 006. Further, in step 007, he selects the reading of the selected information file, printing out it, or the down-loading of it into his personal computer. Also, in step 040, the user determines whether or not this process is to be ended, that is, whether or not he will return to this menu-selection process, and if the returning to this process is not necessary, this process is logged off.

If the user selects the inquiry menu, he opens a fixed-form picture for input in step 008, and confirms contents of the display portion of user information in step 009. Next, he selects names of components relevant to the contents of his inquiry in step 010; inputs the subject of the inquiry in step 011; inputs his desired due-date for response in step 012; inputs names of relevant documents in step 013; and inputs the detailed contents of the inquiry in step 014. Further, in step 015, he determines whether or not there is any file to be attached. If it is necessary to attach a file for supplemental explanation, such as a data file, a document file, etc., he performs the processing of file-attachment in step 016, and stores (sends) the contents of the inquiry in the inquiry content data base in step 017. Otherwise, he simply stores the contents of the inquiry in step 035. Then, this inquiry process is ended, or in step 040, the user determines whether or not this process is to be ended, and if the returning to the menu-selection picture is not necessary, this inquiry process can be logged off in step 041.

Next, the case wherein the retrieval menu is selected in the menu-selection picture in step 004, is explained below. If the retrieval menu is selected, a retrieval information-input picture is first displayed in step 020, and the user selects one of the retrieval concerning the history of inquiries sent from the users and the retrieval concerning the history of answers to the respective inquiries sent to the information service furnisher, in step 021.

If the retrieval concerning the history of inquiries is selected, by inputting the retrieval conditions such as names of objects such as components, parts of a component, or a time interval in the history, in step 022, the information in the inquiry history, which accords with the input retrieval conditions, is selected in step 023. Here, as the result of the retrieval, it is possible to output the inquiry history information along with the answer history information corresponding to the inquiry history information. Further, in step 024, the history information is stored in the data base as the need demands. Furthermore, the result of the retrieval, which is obtained in the retrieval concerning the history of inquiries, is sent to the user in step 025.

Moreover, if the user selects the retrieval concerning the history of answers in step 021, he inputs a name of the plant about which the retrieval is performed, in step 030, and then input a name of a component or a part of the plant, about which the retrieval is performed, in step 031. Further, he inputs the phenomenon which has occurred at the component (the part), in step 032. When the inputting of the above information is completed, an answer to the information input by the user, such as the phenomenon, etc., is searched in the information previously stored in the data base in step 033, a countermeasure to the phenomenon which has occurred is output. After the output result of the retrieval is stored in the data base along with the retrieval conditions input by the user in step 034, it is sent to the user in step 035.

Next, the answer-retrieval performed in step 033 is explained below in detail with reference to FIG. 26. FIG. 26 shows examples of input of the retrieval conditions and results of the retrieval.

In the answer-retrieval, as shown in FIG. 28, the user inputs a name 81 of a component of the object plant, a portion 82 of the component, at which an anomaly has occurred, a phenomenon 83 which has occurred at the portion 82, as the retrieval conditions 80. By inputting the above retrieval conditions 80, a cause 85 of the anomaly and a countermeasure 86 to the anomaly are output as the results of the retrieval. That is, by the inputting of the retrieval conditions 80, which is performed by the user or the information service furnisher, the retrieval system 71 or 74 executes the retrieval process so that an answer which accords with the input retrieval condition 82 is selected from among the information previously stored in the data base.

For example, if "gas turbine", "combustor", and "crack at the main combustion chamber" are input to name 81 of a component, portion 82 of the component, and phenomenon 83, respectively, as the retrieval conditions 80, cause 85 of "large thermal stress" and countermeasure 86 of "adhibit repair by welding" are output as the results of the retrieval. Further, if "steam turbine", "moving blade", and "increase of vibration amplitude" are input to name 81 of a component, portion 82 of the component, and phenomenon 83, respectively, as the retrieval conditions, cause 85 of "deposit of scale" and countermeasure 86 of "perform honing processing in periodic inspection" are output as the results of the retrieval.

Moreover, if there is a plurality of answers which accord to the retrieval conditions 80, it is preferable to output the plurality of the answers. This is because there is occasionally a plurality of causes 85 and countermeasures 86 to the same component name 81, portion 82, and phenomenon 83. For example, if "gas turbine", "bearing", and "large vibration" are input to name 81 of a component, portion 82 of the component, and phenomenon 83, respectively, the following two sets of results are output: that is, the set of cause 85 of "unbalance" and countermeasure 86 of "attach a balance weight", and the set of cause 85 of "unbalance" and countermeasure 86 of "attach a balance weight". In this way, by outputting a plurality of countermeasures as the results of the retrieval, even if there are a plurality of causes to the same retrieval conditions, it is possible to obtain a countermeasure to each of the plurality of the causes. Meanwhile, if cause 85 is input an one item of the retrieval conditions 80, the accuracy of the retrieval will be improved.

Further, if there are many output results of the retrieval, by considering the used time or the remaining life time of each portion of a component, and assuming that the probability of anomaly occurrence at a portion of an component, which has a longer used time or a shorter remaining life time, is higher, the priority of cause 85 or countermeasure 86 to be output can be set. Moreover, if sets of causes 85 and countermeasures 86 are displayed in a picture in the form of a list, by displaying a set of a higher priority in the above sets as the results of the retrieval at a more upper position, by larger characters, or by predetermined color, in the picture, the user can efficiently adhibit a countermeasure to the anomaly which has occurred. Also, by obtaining the frequency or number of times of anomalies, which have occurred, corresponding to each cause, based on the history of anomalies which have occurred, and assuming it is highly probable that the cause of the anomaly which has currently occurred is a cause of the highest occurrence frequency or largest number of occurrence times of anomalies corresponding to this cause probably, a countermeasure 86 to such a cause can be furnished to the user as a countermeasure of the highest priority.

In FIG. 7, a flow chart of processes performed by the information service furnisher in order to create an answer document while using the answer system 12 for the information service furnisher, is mainly shown. That is, the processes performed by the information processing program (2) 14 shown in FIG. 1, are shown in detail in FIG. 7.

First, if the user inputs his inquiry, the contents of the inquiry are registered in the web server 4 for the users. Further, the contents of the inquiry, which have been input by the user, are automatically taken into the second web server 10. Then, the answer system 12 for the information service furnisher performs the retrieval processing, and if there is a new inquiry, a fixed-form e-mail is automatically sent to the inquiry-receiving and allocating person 19 in the answer center 18.

If any person in the answer center 18 receives the fixed-form e-mail, he logins in the answer system 12 for the information service furnisher, and performs the predetermined processes. Further, he sends a fixed-form e-mail to the next person in charge, and ends the processing of the sent fixed-form e-mail.

The contents of the processes performed by the inquiry-receiving person 19 are the receiving and allocating of the inquiry (step 018), the sending of a formal answer document to the user (step 030), the summing of workhours of the answer-creating person 22, and the periodical reporting of the summed workhours to each user with a predetermined-form paper (step 31).

The regional inquiry-managing person 20 first processes the confirming of the contents of the inquiry, the input due-date for response, and the inquiry No., (step 019). Here, the input due-date for response, and the inquiry No., are automatically stored as information which can be read by users, (step 020). Next, he requests an inquiry-translation (step 021), and confirms the contents of the translated inquiry. Further, he requests answer-creation to the answer-creating person 22 (step 023). The answer-creating person 22 retrieves the information stored in the data base (step 032), and creates an answer based on the result of the retrieval. Further, the regional inquiry-managing person 20 confirms the contents of an answer sent from the answer-creating person 22, and the regional inquiry-managing person 20 requests answer-translation to the translator 21, (step 027). Furthermore, the regional inquiry-managing person 20 checks the translated answer, and requests the sending of a formal answer, to the inquiry-receiving and allocating person 19, (step 029). Moreover, the regional inquiry-managing person 20 stores the answer in the data base (step 033). Meanwhile, it is possible to store the answer in the data base along with the inquiry sent from the user and the technical information file which has sent to the user according to the request sent from the user. Here, if the regional inquiry-managing person 20 determines whether or not the creating of an answer to the inquiry needs opinions of members in a plurality of relevant sections, he registers the inquiry as a subject in the electric meeting room (step 024), and the conclusions of the meeting are made up as an answer to the inquiry (step 025).

Moreover, the translator 21 translates the inquiry (step 022) and the answer (step 028). Also, the answer-creating person 22 creates an answer document. Moreover, the answer-creating person inputs and sends work hours taken for creating the answer (step 026).

As described above, if the inquiry is sent from a user in a foreign country, the inquiry is processed by the inquiry-receiving and allocating person 19, the regional inquiry-managing person 20, the translator 21, the regional inquiry-managing person 20, the answer-creating person 22, the regional inquiry-managing person 20, the translator 21, the regional inquiry-managing person 20, and the inquiry-receiving and allocating person 19, in turn. Thus, the inquiry and the answer are translated. The translation performed by the translator can realize quick understanding of the contents of a sent inquiry, and quick creation of an answer to the inquiry.

On the other hand, if the inquiry is sent from a domestic user, the inquiry is processed by the inquiry-receiving and allocating person 19, the regional inquiry-managing person 20, the answer-creating person 22, the regional inquiry-managing person 20, and the inquiry-receiving and allocating person 19, in turn. Thus, the answer document is created and sent to the user.

FIGS. 8-12 show examples of display pictures for input operations, which are performed by a user, in the answer system for technical support. In the following, the display pictures will be explained in detail.

Figure 8:
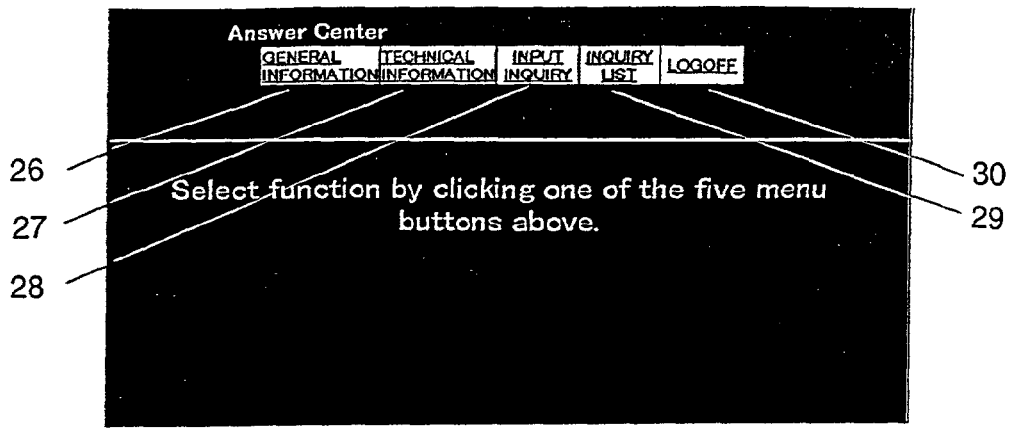
FIG. 8 is an example of a picture displayed on the screen for input operations which are performed by a user.

FIG. 8 shows the initial picture which is first displayed after login of the user. In this picture, a process item desired by the user in the displayed menu is selected. The selecting of the desired process item is implemented by clicking one of the general information button 26, the technical document button 27, the inquiry-inputting button 28, the inquiry history button 29, and the logoff button 30.

Figure 9:
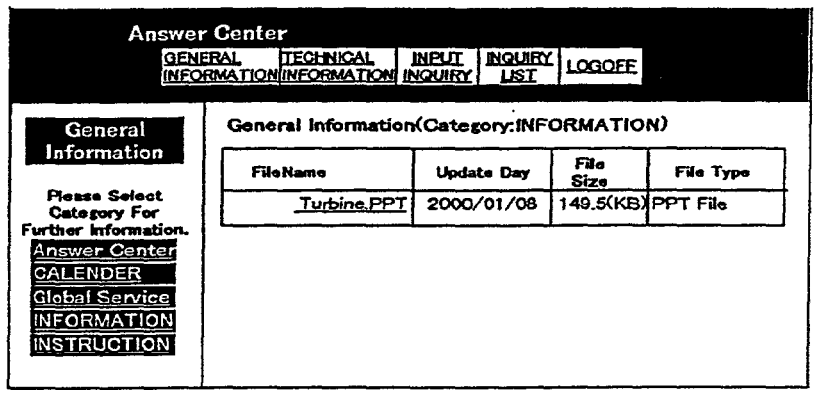
FIG. 9 is an example of a picture displayed on the screen for input operations which are performed by a user.
Figure 10:
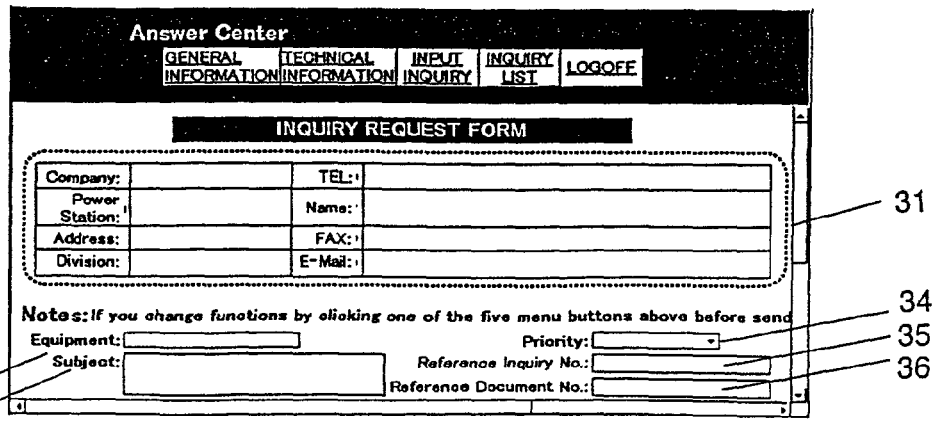
FIG. 10 is an example of a picture displayed on the screen for input operations which are performed by a user.
Figure 17:
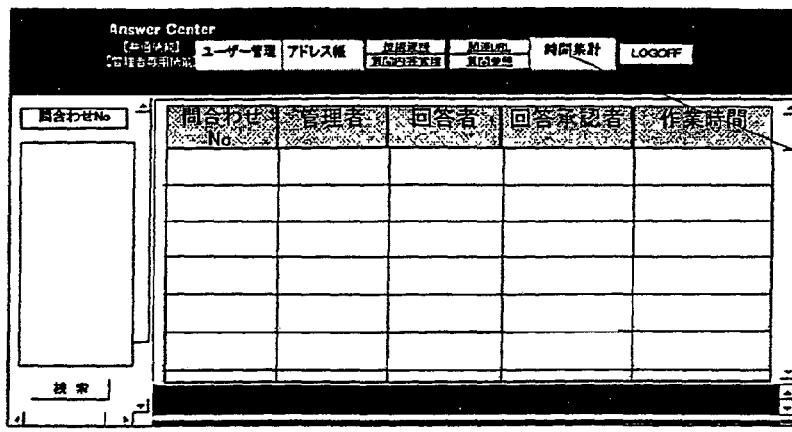
FIG. 17 is an example of a picture displayed on the screen for input operations which are performed by an information service furnisher.

FIG. 9 shows a list of information files disclosed as the general information. A user selects a file which he desires from among the information files displayed in this picture by clicking the general information button 26, and reads the selected file or downloads it into the computer 1 or mobile terminal 2 which he uses. Also, if a user intends to acquire a technical document, a file list of technical documents is displayed by clicking the technical document button 27. Further, he selects a file which he desires from among the displayed files, and reads the selected file or downloads it into the computer 1 or mobile terminal 2 which he uses.

FIG. 8 shows a fixed-form picture for inputting an inquiry of a user. The user clicks the inquiry-inputting button 28, and first confirms the name of his company, his name, and his address of e-mail, which are displayed on the information-display portion 31. Next, he selects names of components relevant to his inquiry by pulling down the component name-selection portion 32. Then, he inputs the subject 33 of the inquiry, the desired due-date 34 for response, and the relevant document number 36, in turn. Further, he inputs the detailed contents of the inquiry to the portion 37 shown in FIG. 11, and sends them by clicking the inquiry-sending button 38. If there is a file of technical document to be attached to the inquiry, he attaches the file by clicking the file-attaching button 39.

FIG. 12 shows a list 40 of inquiry history. By clicking the inquiry history button 29, the user can confirm the date when an answer to his inquiry is sent to him, or the inquiry history until the present time.

FIGS. 13-25 show examples of pictures for input operations, which are performed by the information service furnisher, in the answer system for technical support. In the following, the pictures will be explained in detail.

FIG. 13 shows the initial picture in the answer system 12 for the information service furnisher which is incorporated into the second web server 10 in the intranet 11. Each person of the answer center 18 logins by inputting his identifier 41 and password 42.

Figures 14, 15, 16:
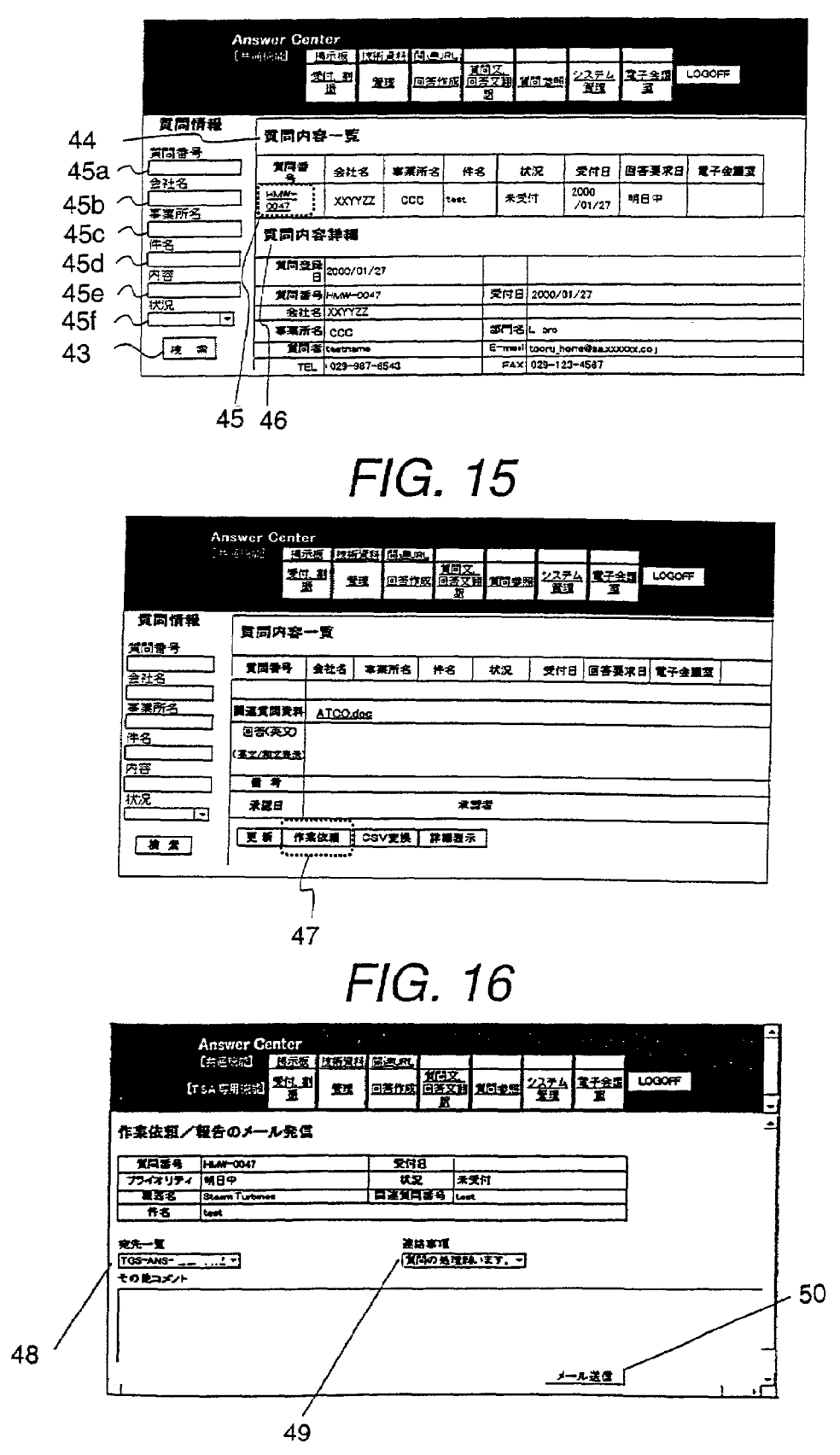

When an inquiry-receiving and allocation person 19 clicks the retrieval button 43 after inputting at least one of inquiry number 45a, name 45b of company, name 45b of plant, name 45d of case, contents 45e of inquiry, and situation 46f, the summary list 44 of inquiry items to be processed is displayed in the picture shown in FIG. 14. Further, in order to process the inquiry items, he clicks the inquiry number button 45, and confirms the detailed contents 46 of the inquiry. Next, he clicks the request button 47 of work in the picture shown in FIG. 15. Then, in the picture shown in FIG. 16, he selects the address of a regional inquiry-managing person in charge from among the address list 48 of the answer center personnel and the type of the request for work from among the communication matters 49, based on the contents of the inquiry sent from the user. Lastly, by clicking the mail-sending button 50, he completes his operations for the request for work. In addition, by clicking the workhour-summation button 51, he periodically reports the summed workhours of the answer-creating person in charge by a predetermined-form to the designated user.

Figure 18:
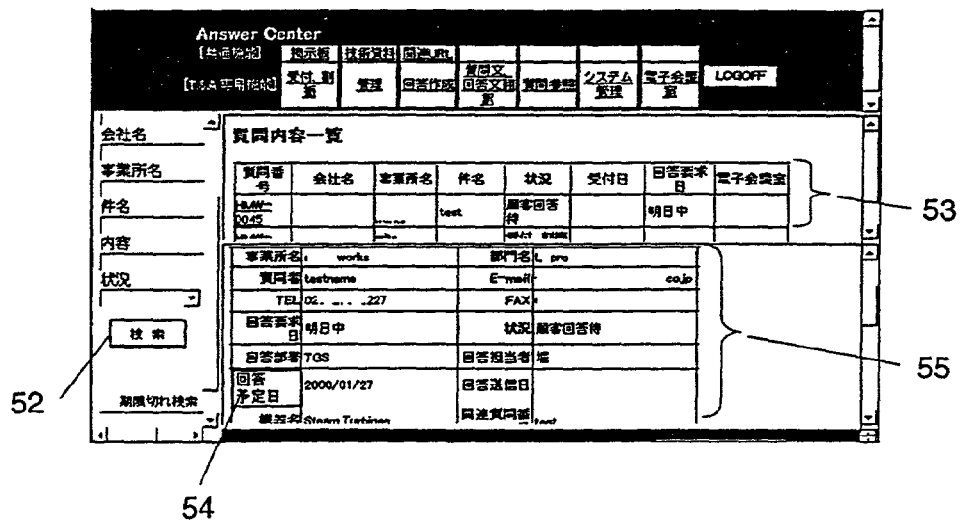
FIG. 18 is an example of a picture displayed on the screen for input operations which are performed by an information service furnisher.

When the regional inquiry-managing person 20 clicks the retrieval button 52 in the picture shown in FIG. 18, the summary list 53 of inquiries to be processed is displayed. Further, in order to process the inquiry items, he clicks the inquiry number button, and confirms the detailed contents 55 of the inquiry. Furthermore, he inputs the due-date 54 for response.

Figure 19:
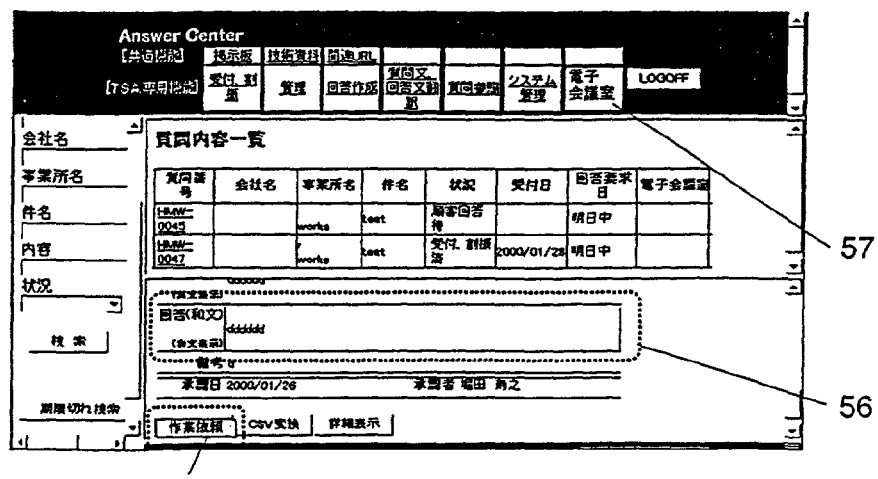
FIG. 19 is an example of a picture displayed on the screen for input operations which are performed by an information service furnisher.

If the regional inquiry-managing person 20 creates an answer by himself, he inputs the answer to the answer area 56 in the picture shown in FIG. 19. On the other hand, if he requests an answer-creating person 22 to create an answer, he performs this request by clicking the request button 47 of work. Here, if he determines that the creating of an answer to the inquiry needs opinions of members in a plurality of relevant sections, he accesses and logins into the electric meeting system by clicking the electric meeting room button 57. Further, he registers the contents of the inquiry as the subject of the meeting, and holds the investigative meeting.

Lastly, he inputs the conclusions obtained in the meeting to the answer area 56, as the answer.

Figures 20, 21, 22:
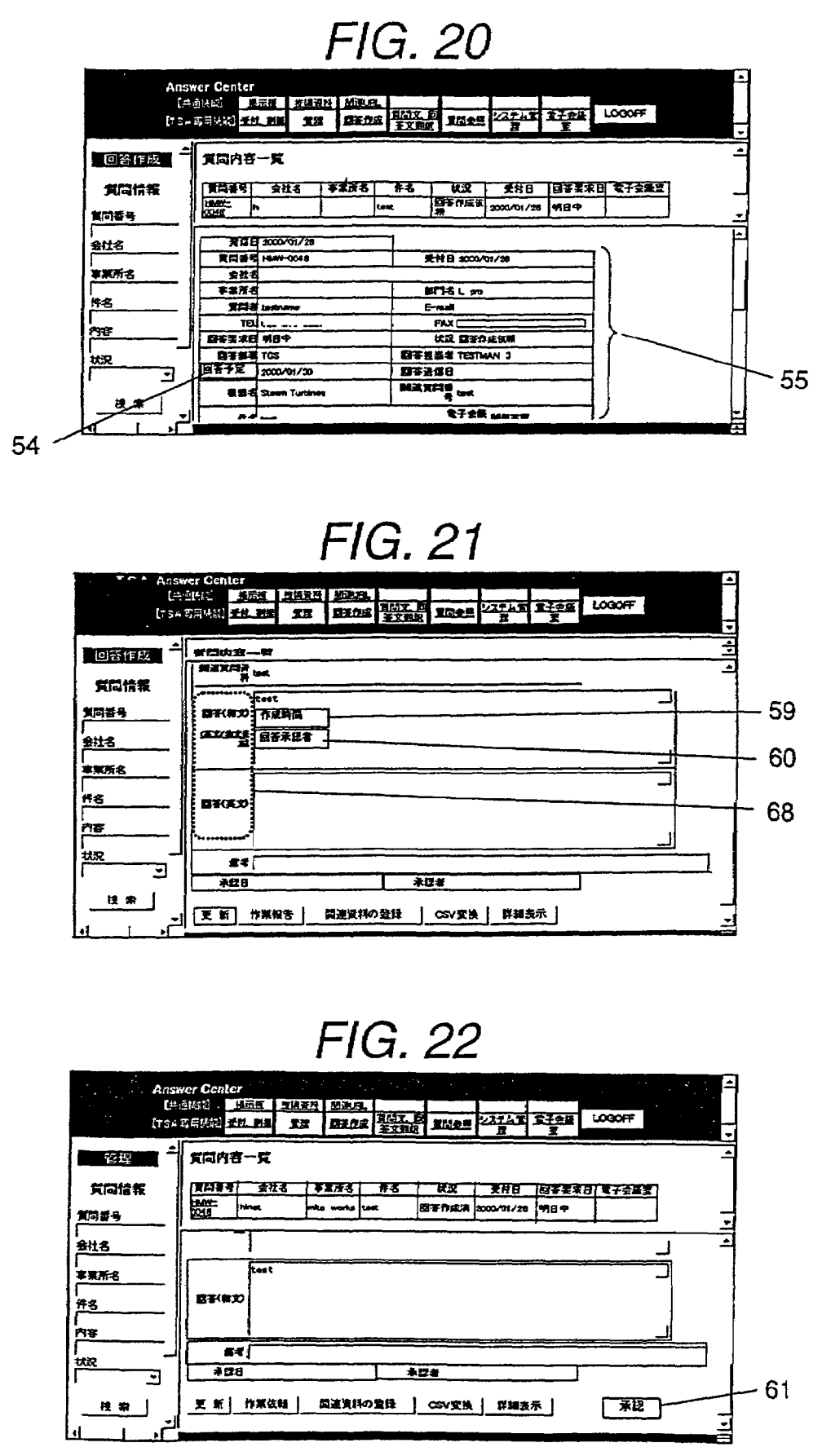

The answer-creating member 22 inputs the answer to the answer area 58 in the picture shown in FIG. 21 after confirming the information in the area 55 for the detailed contents of the inquiry and in the due-date portion 54 for response. Here, he inputs the workhours 59 taken for creating the answer and the name 60 of the acknowledger which has acknowledged the contents of the answer to the answer area along with the contents of the answer.

The regional inquiry-managing person 20 confirms the contents of the answer created by the answer-creating person, and clicks the acknowledge button 61 in the picture shown in FIG. 22.

Figures 23, 24, 25:
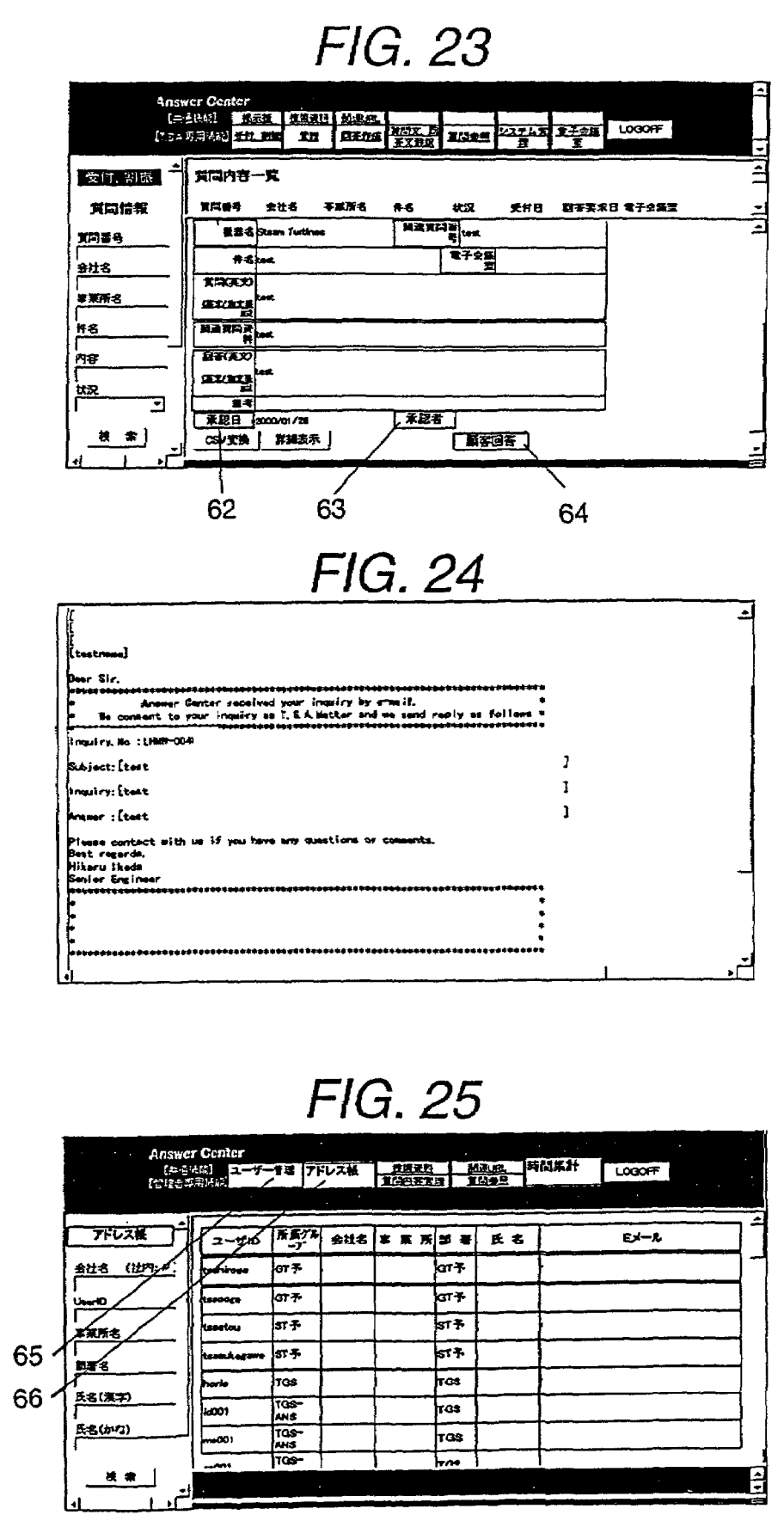

The inquiry-receiving and allocating person 19 sends the answer document by clicking the button 64 for sending an answer to the user after confirming that the date 62 of acknowledge and the name 63 of the acknowledger are indicated in the answer document sent from the regional inquiry-managing person 20, as shown in FIG. 23.

The answer document is sent to the user which sent the inquiry by e-mail as shown in FIG. 24 and FIG. 25. The system-managing person 23 manages the registering and the renewing of; identifiers, passwords, and addresses of e-mail; of the persons of the answer center 18, by operating the user-managing portion 65 and the address notebook portion 66 in the picture shown in FIG. 25.

In the following, as a specific embodiment to which the present invention is applied, the case wherein users are operation/maintenance personnel of a power plant run by a utility company, will be explained. In this embodiment, information services of technical support on components of a thermal or nuclear power plant, such as a steam turbine, a gas turbine, etc., are adequately furnished. Thus, this embodiment relates to a system or a service business in which technical support for operations and maintenance of the power plant, needed by users, is implemented by quickly and timely furnishing great deal of technical information including voice data and dynamic image data, around the clock, by means of a telecommunication network which includes an internet, an intranet, an e-mail, etc.

The users need adequate technical support from a maker of power plant components so as to improve the rate of operation and implement the highly efficient operation, by performing effective maintenance for components such as a steam turbine, a gas turbine, and so on, of a thermal or nuclear power plant. As specific contents of the adequate technical support, concerning the operation, there is technical information on a cause analysis of anomalous operation data, the evaluation of usual operation data, the indication of counter measures to a trouble which has occurred, the performance evaluation of a designated component, etc. Also, concerning the maintenance, there is technical information on the up-to-date maintenance techniques, the timing and method of overhaul of each component, the proposal of components to be exchanged, measures for preventing a trouble from occurring in the power plant, etc.

The power plant component maker edits technical information for optimally supporting the above techniques, as digital information including voice and/or image data, and previously stores the edit technical information in the disclosed document data base 7 in the answer system 5 for the users, which is incorporated into the web server 4 for the users shown in FIG. 1. The user 1 accesses the web server 4 for the users, which is set up in the internet 3 by the information service furnisher, and downloads necessary technical information from the disclosed document data base 7 to the computer 1 which the user uses. Moreover, the power plant component maker provides a picture from which a user can directly input a request for technical review or an inquiry concerning the operation/maintenance.

If the user intends to request a technical review or make an inquiry concerning the operation/maintenance, he inputs the request for a technical review or the inquiry in accordance with the procedures guided by the information processing program (1) 6. The contents of the request for a technical review or the inquiry is automatically registered in the inquiry content data base 9. The registered contents of the inquiry is periodically taken into the second web server via the fire wall 17b in order to retain the proper security of the inquiry. The information service furnisher provides the answer center 18 composed of the inquiry-receiving and allocating person 19, the regional inquiry-managing person 20, the answer-creating person 22, the translator 21, etc. as a client of the second web server 10 in order to quickly respond to an inquiry or an request for a technical document such as that described above.

The answer center 18 accesses the second web server 10 via the intranet 11, and creates an answer document in the accordance with the procedures guided by the information processing program (2) 14 which is provided in the answer system 12 for the information service furnisher. Further, the answer center 18 sends the created answer document to the user by e-mail. The information of the inquiry sent from the user and the answer document to the inquiry is eventually stored in the inquiry content data base 15. Meanwhile, the answer center efficiently creates an answer document while using the automatic translation program 16 and/or the electric meeting system 13 if required. The user can improve the rate of operation, and implement the highly efficient operation of the power plant, by making the technical information furnished by the service furnisher or the contents of the answer document reflect on the operation/maintenance of an existing steam or gas turbine.

Specifically, the user can occasionally omit an dispatch of an engineer from the power plant maker by understanding the furnished technical information, and making it reflect on his actual field work. Also, since the user can easily and timely obtain necessary technical information, he can receive technical support as if there were an expert of the power plant maker in the next room. Further, since the user can more quickly obtain the answer to his inquiry with using the answer system according to the present system than without using it, it can be expected that a slight malfunction or an improper operation can be prevented from escalating to a sever trouble. Furthermore, more understandable and effective plant operations or maintenance is possible by using the answer system than by using conventional technical documents described on papers. In addition, the information service furnisher can consistently process and manage the creating of technical documents and answer documents to inquiries from the users by using the answer system for technical support system.

Further, by recognizing what information the users need or what questions they have about the plant components, it is possible to propose optimal operation and maintenance methods, and to open up a new business such as sales of renewal parts, spare parts, etc.

Furthermore, by fitly counting the workhours (labor cost) taken for a job such as a creation of an answer document in order to account the charge of information service, and regularly reporting the counted workhours, it is possible to onerously furnish information for technical support.

Moreover, since a power plant including steam turbines or gas turbines is socially important, a security system for protecting the leakage or the invasion of the technical information on the power plant is necessary. For this purpose, in this embodiment, it is possible to provide the answer system for technical support in which the security system is implemented by incorporating at least one fire wall.

In addition, according to this embodiment, by receiving inquiries from the users via the internet, it is possible to receive accesses from users to this answer system for technical support around the clock, which can implement quick technical support responding to inquiries sent from users at remote locations such as oversea users.

In accordance with the present invention, it is possible to provide an answer system for technical support and a technical support method, which is capable of quickly and accurately performing technical support to a request or an inquiry from a user.

What is claimed is:

1. An answer system for technical support for a power plant comprising:
    an answer center for a service furnisher, said answer center furnishing information relating to techniques of operation and/or maintenance of components of the power plant to a user via a telecommunication network;
    a first web server and a second web server provided on said telecommunication network,
    a first firewall for allowing a predetermined user to access said first web server and preventing outsiders other than the predetermined user from unauthorized accessing of said first web server;
    wherein
    said first web server is a web server for the user, that is accessed by a predetermined user and provided with an answer system for the user, and said second web server is a web server for the service furnisher, that is accessed by said answer center and provided with an answer system for the service furnisher,
    said answer system for the user and said answer system for the service furnisher each have inquiry information registering means for registering inquiry information relating to said power plant component techniques sent from the predetermined user, and an inquiry-history information registering means for registering the inquiry information and answer information to the inquiry information as inquiry-history information of the inquiry relating to said power plant component techniques,
    said answer system for the user is further provided with a processing program for registering the inquiry information relating to said power plant component techniques, inputted by the predetermined user, into said inquiry information registering means of said answer system for the user, and a retrieving means constructed so that the predetermined user is able to retrieve the inquiry-history information relating to said power plant component techniques, said inquiry-history information having been inquired of by the user and registered in said inquiry-history information registering means of said answer system for the user, and
    said answer system for the service furnisher is further provided with a processing program for taking in periodically the inquiry information registered in said inquiry information registering means of said answer system for the user and registering the taken information into said inquiry information registering means of said answer system for the service furnisher, and communication means for communicating the inquiry information relating to said power plant component techniques and registered in said inquiry information registering means of said answer system for service furnisher to said answer center;
    a second firewall for preventing predetermined users from accessing said second web server for the service furnisher;
    means for inputting an answer responding to inquiry information relating to said power plant component techniques and communicated to said answer center; and
    answer sending means for sending the answer inputted by said input means to the user via the telecommunication network.

2. An answer system for technical support for a power plant according to claim 1, wherein said answer system for a user includes means for sending information including voice data and/or dynamic image data to the user.

3. An answer system for technical support for a power plant according to claim 1, wherein
    said first web server for the user receives inquiry information relating to the power plant component techniques from the predetermined user via an internet,
    said second web server for the service furnisher sends inquiry information relating to the power plant component techniques from the predetermined user to said answer center via intranet, and
    said answer sending means has a mail server.

4. An answer system for technical support for a power plant according to claim 1, further comprising a means for counting work hours of a professional staff which have corresponded with the inquiry sent from the user and reporting said work hours or charges calculated based on the work hours to said user.

5. An answer system for technical support for a power plant according to claim 1, further comprising a translation system for translating an answer sent from said information service furnisher to said user.

6. An answer system for technical support for a power plant comprising:
    an answer center for a service furnisher, said answer center furnishing information relating to techniques of operation and/or management of components of the power plant to a user via a telecommunication network;
    a web server provided on said telecommunication network,
    a firewall for allowing a predetermined user to access said web server and preventing outsiders other than the predetermined user from unauthorized accessing of said web server;
    wherein
    said web server is provided with an answer system for the user, that is accessed by the predetermined user, and an answer system for the service furnisher, that is accessed from said answer center,
    said answer system for the user and said answer system for the service furnisher each have inquiry information registering means for registering inquiry information relating to said power plant component techniques sent from the predetermined user, and an inquiry-history information registering means for registering the inquiry information and answer information to the inquiry information as inquiry-history information of the inquiry relating to said power plant component techniques,
    said answer system for the user is further provided with a processing program for registering the inquiry information relating to said power plant component techniques, inputted by the predetermined user, into said inquiry information registering means of said answer system for the user, and a retrieving means constructed so that the predetermined user is able to retrieve the inquiry-history information relating to said power plant component techniques, said inquiry-history information having been inquired of by the user and registered in said inquiry-history information registering means of said answer system for the user, and said answer system for the service furnisher is further provided with a processing program for periodically taking in the inquiry information registered in said inquiry information registering means of said answer system for the user and registering the taken information into said inquiry information registering means of said answer system for the service furnisher, and communication means of said answer system for the service furnisher, and communication means for communicating the inquiry information relating to said power plant component techniques and registered in said inquiry information registering means of said answer system for the service furnisher to said answer center;

means for inputting an answer responding to inquiry information relating to said power plant component techniques and communicated to said answer center; and answer sending means for sending the answer inputted by said input means to the user via the telecommunication network.

7. An answer system for technical support for a power plant comprising:

an answer center for a service furnisher, said answer center furnishing information relating to techniques of operation and/or management of components of the power plant to a user via a telecommunication network;

a first web server provided on said telecommunication network, a first firewall for allowing a predetermined user to access said first web server and preventing outsiders other than the predetermined user from unauthorized accessing of said first web server;

wherein said first web server is a web server for the user, that is accessed by a predetermined user via said telecommunication network and provided with an answer system for the user, and said web server is a web server for the service furnisher, that is accessed from said answer center via said telecommunication network and provided with an answer system for the service furnisher, said answer system for the user and said answer system for the service furnisher each have inquiry information registering means for registering the inquiry information relating to said power plant component techniques sent from the predetermined user, said answer system for the user is further provided with a processing program for registering the inquiry information relating to said power plant component techniques, inputted by the predetermined user, into said inquiry information registering means of said answer system for the user, and said answer system for the service furnisher is further provided with a processing program for taking in periodically the inquiry information registered in said inquiry information registering means of said answer system for the user and registering the taken information into said inquiry information registering means of said answer system for the service furnisher, and communication means for communicating the inquiry information relating to said power plant component techniques via said intranet and registered in said inquiry information registering means of said answer system for the service furnisher to said answer center;

a second firewall for preventing predetermined users from accessing said second web server for the service furnisher; and means for inputting an answer responding to inquiry information relating to said power plant component techniques and communicated to said answer center; and answer sending means for sending the answer inputted by said input means to the user via the telecommunication network.

8. An answer system for technical support, according to claim 7 further comprising:

a database having combined answer information registered therein for each of apparatuses or components comprising the power plant, said combined answer information being information obtained by making, in advance, a cause of an abnormality phenomena which has occurred in each said apparatus or component and a countermeasure to the cause to correspond to each other and combining the cause and the countermeasure; and a retrieving system for retrieving countermeasure information contained in said database, to the inquiry about the power plant abnormality sent from the user via said telecommunications network, wherein said retrieving means comprises:

a retrieving condition input function means having an input function of inputting the name of a power plant to be retrieved, a function of inputting the name of apparatus or component to be retrieved from components and apparatuses composing said inputted power plant, and a function of inputting a phenomena occurred in the apparatus or component to be retrieved; and a retrieved result means outputting retrieved countermeasure information matched with the retrieving conditions inputted by said retrieving condition input function means, based on said database, and outputting, irrespective of difference in causes of the occurred abnormality phenomena when a plurality of countermeasure information matched with said retrieving conditions exists, the plurality of countermeasure information.

9. An answer system for technical support according to claim 8, wherein said retrieving system has means whereby, on the basis of an operation time of an apparatus at which an abnormality occurred or a portion of the apparatus at which an abnormality occurred and as to which the user inquired, the longer the operation time is, the higher a priority of countermeasure information for the abnormality caused thereby is made, in a case where there is a plurality of countermeasure information outputted as a retrieving result.

10. An answer system for technical support according to claim 8, wherein said retrieving system has means whereby, on the basis of past abnormality occurrence frequencies or times of an apparatus at which an abnormality occurred or a portion of the apparatus at which an abnormality occurred and as to which the user inquired, the higher the abnormality occurrence frequencies are or the more the abnormality occurrence times are, the higher a priority of countermeasure information for the abnormality caused thereby is made, in a case where there is a plurality of countermeasure information outputted as a retrieving result.

* * * * *